US008855406B2

(12) United States Patent
Lim et al.

(10) Patent No.: US 8,855,406 B2
(45) Date of Patent: Oct. 7, 2014

(54) EGOMOTION USING ASSORTED FEATURES (75) Inventors: Jongwoo Lim, Sunnyvale, CA (US); Vivek Pradeep, Bellevue, WA (US)

(73) Assignee: Honda Motor Co., Ltd., Tokyo (JP)

(*) Notice: Subject to any disclaimer, the term of this patent is extended or adjusted under 35 U.S.C. 154(b) by 313 days.

(21) Appl. No.: 13/219,184

(22) Filed: Aug. 26, 2011

(65) Prior Publication Data
US 2012/0063638 A1 Mar. 15, 2012

Related U.S. Application Data (60) Provisional application No. 61/381,811, filed on Sep. 10, 2010.

(51) Int. Cl.
G06K 9/00 (2006.01)
G06T 7/00 (2006.01)
G06T 7/20 (2006.01)

(52) U.S. Cl.
CPC ..... G06T 7/2033 (2013.01); G06T 2207/30244 (2013.01); G06T 7/0065 (2013.01); G06T 2207/20088 (2013.01); G06T 7/2086 (2013.01)
USPC ............................. 382/154; 382/103; 382/153

(58) Field of Classification Search
None
See application file for complete search history.

(56) References Cited

U.S. PATENT DOCUMENTS

| 5,598,515 | A | 1/1997 | Shashua |
| 6,192,145 | B1 | 2/2001 | Anandan et al. |
| 6,271,855 | B1 | 8/2001 | Shum et al. |
| 6,571,024 | B1* | 5/2003 | Sawhney et al. ............ 382/294 |
| 6,859,549 | B1 | 2/2005 | Oliensis |
| 6,970,591 | B1* | 11/2005 | Lyons et al. .................. 382/154 |
| 6,999,612 | B1 | 2/2006 | Oliensis |
| 8,509,522 | B2* | 8/2013 | Robert ........................... 382/154 |
| 2003/0058945 | A1 | 3/2003 | Chiba et al. |
| 2004/0086174 | A1* | 5/2004 | Sun ............................... 382/154 |
| 2008/0152192 | A1 | 6/2008 | Zhu et al. |
| 2012/0121161 | A1* | 5/2012 | Eade et al. ..................... 382/153 |
| 2012/0206597 | A1* | 8/2012 | Komoto et al. ............... 348/135 |

FOREIGN PATENT DOCUMENTS

CN 101432776 5/2009
WO WO 98/18117 4/1998

OTHER PUBLICATIONS

Barni et al. (Sep. 1996) "Unsupervised detection of straight lines through possibilistic clustering." Proc. Int'l Conf. on Image Processing, vol. 2 pp. 963-966.*
Pradeep et al. (Jun. 2010) "Egomotion using assorted features." Proc. 2010 IEEE Conf. on Computer Vision and Pattern Recognition, pp. 1514-1521.*

(Continued)

*Primary Examiner* — Barry Drennan
(74) *Attorney, Agent, or Firm* — Fenwick & West LLP; Mark E. Duell (57) ABSTRACT

A system and method are disclosed for estimating camera motion of a visual input scene using points and lines detected in the visual input scene. The system includes a camera server comprising a stereo pair of calibrated cameras, a feature processing module, a trifocal motion estimation module and an optional adjustment module. The stereo pair of the calibrated cameras and its corresponding stereo pair of camera after camera motion form a first and a second trifocal tensor. The feature processing module is configured to detect points and lines in the visual input data comprising a plurality of image frames. The feature processing module is further configured to find point correspondence between detected points and line correspondence between detected lines in different views. The trifocal motion estimation module is configured to estimate the camera motion using the detected points and lines associated with the first and the second trifocal tensor.

31 Claims, 6 Drawing Sheets

(56) References Cited

OTHER PUBLICATIONS

Pradeep et al. (2012) "Egomotion estimation using assorted features." Int'l J. Computer Vision, vol. 98 pp. 202-216.*

Wang et al. (Oct. 2009) "Feature points detection and tracking based on SIFT combining with KLT method." Proc. SPIE 7506, Article 75062N.*

Yu et al. (Oct. 2006) "Recursive camera-motion estimation with the trifocal tensor." IEEE Trans. on Systems, Man, and Cybernetics, vol. 36 No. 5, pp. 1081-1090.*

Yu et al. (Mar. 2008) "Robust 3-d motion tracking from stereo images: a model-less method." IEEE Trans. on Instrumentation and Measurement, vol. 57 No. 3, pp. 622-630.*

Zhang, Z. (1998) "Determining the epipolar geometry and its uncertainty: a review." Int'l J. Computer Vision, vol. 27 No. 2, pp. 161-195.*

Torr et al. (1997) "Robust parameterization and computation of the trifocal tensor." Image and Vision Computing, vol. 15 pp. 591-605.*

Horn, B.K.P. (Apr. 1987) "Closed-form solution of absolute orientation using unit quaternions." J. Optical Society of America A, vol. 4 No. 4, pp. 629-642.*

Rosten et al. (Oct. 2005) "Fusing points and lines for high performance tracking." Proc. $10^{th}$ IEEE Int'l Conf. on Computer Vision, vol. 2 pp. 1508-1515.*

Nister, D. (Jul. 2000) "Reconstruction from uncalibrated sequences with a hierarchy of trifocal tensors." LNCS vol. 1842, pp. 649-663.*

Jeong et al. (Oct. 2006) "Visual SLAM with line and corner features." Proc. 2006 IEEE/RSJ Int'l Conf. on Intelligent Robots and Systems, pp. 2570-2575.*

Bartoli, A. et al., "Structure-From-Motion Using Lines: Representation, Triangulation and Bundle Adjustment," Dec. 2005, Computer Vision and Image Understanding, vol. 100, No. 3, pp. 416-441.

Bretzner, L. et al., "Structure and Motion Estimation using Sparse Point and Line Correspondences in Multiple Affine Views," Computational Vision and Active Perception Laboratory (CVAP), Dept. of Numerical Analysis and Computing Science, Technical Report ISRN KTH/NA/P 99/13/SE, 1998, Stockholm, Sweden, thirty-three pages.

Fitzgibbon, A. et al., "Automatic 3D Model Acquisition and Generation of New Images from Video Sequences," Dept. of Engineering Science, University of Oxford, 1998, eight pages.

Hartley, R., "Lines and Points in Three Views and the Trifocal Tensor," *International Journal of Computer Vision*, Mar. 1997, vol. 22, Issue 2, twenty-four pages.

Johansson, B. et al., "Structure and Motion Estimation from Complex Features in the Three Views," Centre for Mathematical Sciences, Lund University, 2002, six pages.

PCT International Search Report and Written Opinion, PCT Application No. PCT/US2009/051306, Sep. 30, 2009, 7 pages.

Taylor, C. et al., "Structure and Motion from Line Segments in Multiple Images," IEEE Transactions on Pattern Analysis and Machine Intelligence, Nov. 1995, vol. 17, No. 11, pp. 1021-1032.

Zhang, Z., "Estimating Motion and Structure from Correspondences of Line Segments Between Two Perspective Images," INRIA Research Report No. 2340, 1994, 25 pages.

* cited by examiner

EGOMOTION USING ASSORTED FEATURES

CROSS REFERENCE TO RELATED APPLICATIONS

This application claims priority from U.S. Patent Application No. 61/381,811, entitled "Egomotion Using Assorted Features", filed on Sep. 10, 2010, which is hereby incorporated by reference in its entirety. This application is also related to U.S. patent application Ser. No. 12/506,560, entitled "Structure and Motion with Stereo Using Lines", filed on Jul. 21, 2009.

FIELD OF THE INVENTION

The invention relates generally to estimating camera motion of a visual scene, and in particular to estimating camera motion of a visual scene using a stereo pair of cameras with lines and points features of the visual scene.

BACKGROUND

Visual odometry is a process of determining the position and orientation of a moving object (e.g., a robot) by analyzing the associated camera images. Real-time estimation of camera motion using only sparse sets of features from visual input in visual odometry is an active and challenging research topic in the computer vision and robotics communities. The number of features (e.g., points and lines) observed, noise-level (in feature detection as well as tracking) and their distribution, all have a major impact on the final camera motion estimate. For a real-time and robust implementation, it is preferable to have a unified framework that, independent of feature type, computes the camera motion from minimal sets over the available data.

One existing method for performing visual odometry from feature points with stereo cameras uses three feature points extracted from visual input data (e.g., video frames). Since the polynomial constraint for deriving camera motion parameters is configured to use the triangle law of cosines, this approach works only for a configuration of three points in general position and is therefore constrained in a random sample consensus (RANSAC) framework for establishing support.

Other existing methods (e.g., camera motion from four or five known three-dimensional (3D) points) solve polynomial equation systems that are established from geometrical constraints by enforcing algebraic conditions (e.g., rotation matrix orthonormality). The existing methods have tried to develop minimal solver based systems for point feature odometry, but did not make use of line features of visual input data to develop a robust, real-time camera motion estimation system.

Traditionally, line features have been employed in structure from motion algorithms using a multifocal tensor framework. A trifocal tensor is a 3×3×3 cube operator that expresses the projective geometric constraints between three views independent of scene structure. In general, the trifocal tensor has 27 parameters, but only 18 degrees of freedom (up to projective ambiguity). The remaining 9 constraints must be enforced to obtain a consistent solution. Existing four-view extension of multifocal tensor framework exploits the known orientation between a stereo pair of cameras in a quadrifocal tensor to enforce constraints between image intensities of adjacent stereo pairs. However, the existing multifocal tensor framework faces challenges in camera motion estimation due to lack of an efficient unified, closed-form formulation that makes full use of point and line features in a multifocal tensor framework.

SUMMARY OF THE INVENTION

To provide fast and robust camera motion estimation, a camera motion system exploits the known camera parameters of a stereo pair with points and lines detected in visual input data. The term "a line" refers to a digital representation of a line in a digital representation of an input image data. The term "a point" refers to a digital representation of a point in a digital representation of an input image data. By using combination of points and lines of visual input data, the camera motion system provides a suitable camera motion estimation solution in real-time. The disclosed reconstruction system has a wide range application to real world problems, such as applications in robotics and computer vision systems.

One embodiment of a disclosed system (and method) includes estimating camera motion of a visual input scene using points and lines detected in the visual input scene. The system includes a camera server, a feature processing module, a trifocal motion estimation module and an optional adjustment module. The camera server provides a stereo pair of calibrated cameras to capture the visual input scene. The stereo pair of the calibrated cameras and its corresponding stereo pair of camera after camera motion form a first trifocal tensor and a second trifocal tensor. The feature processing module is configured to detect points and lines in the visual input data comprising a plurality of image frames. The feature processing module is further configured to find point correspondence between detected points and line correspondence between detected lines in different views. The trifocal motion estimation module is configured to estimate the camera motion using the detected points and lines associated with the first trifocal tensor and the second trifocal tensor.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

An embodiment of the invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

In addition, the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the claims.

The figures depict various embodiments of the invention for purposes of illustration only. One skilled in the art will readily recognize from the following discussion that alternative embodiments of the structures and methods illustrated herein may be employed without departing from the principles of the invention described herein.

I. System Overview

Figure 1A:
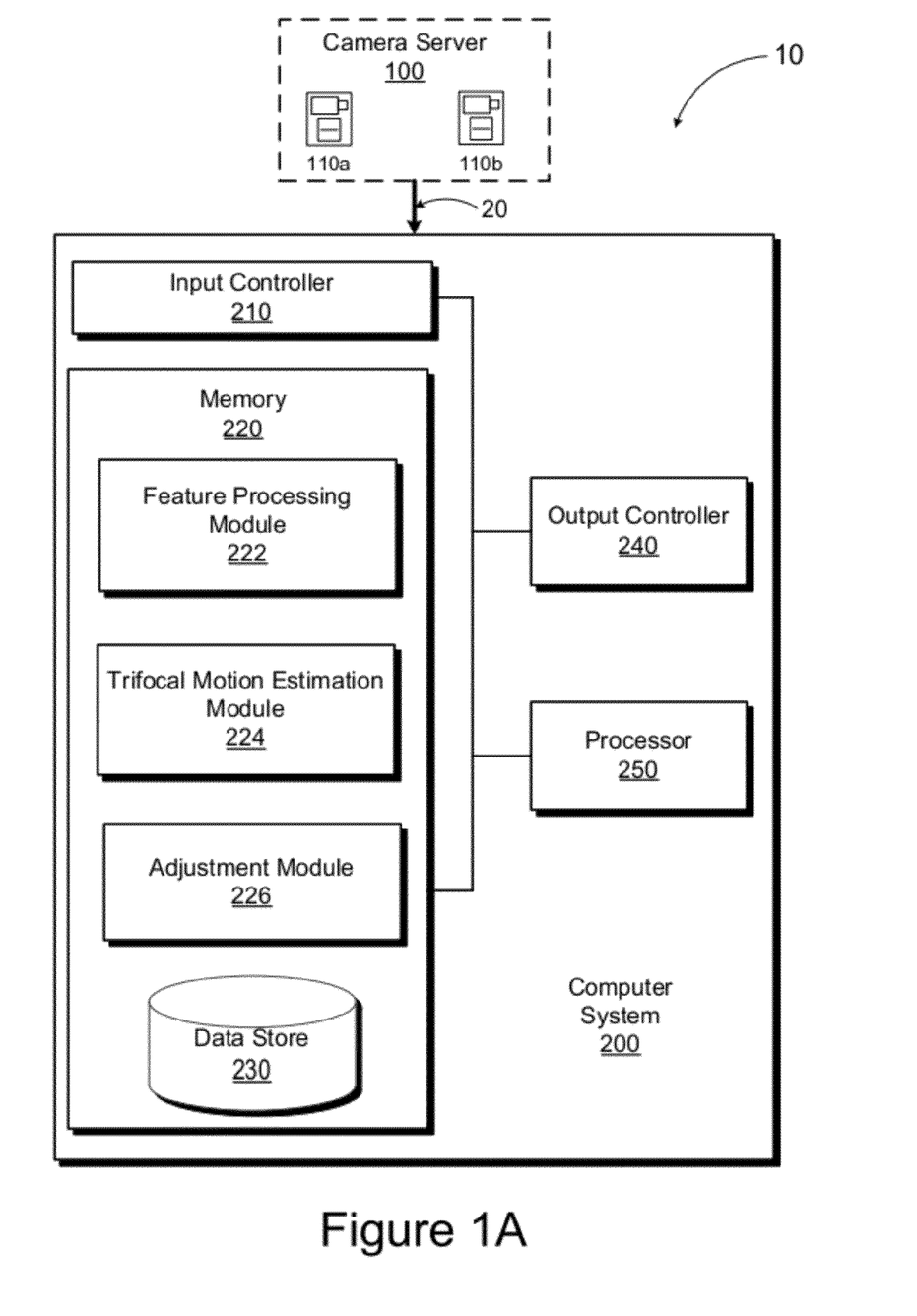
FIG. 1A illustrates a block diagram of a camera-motion system for camera motion estimation according to one embodiment of the invention.

FIG. 1A illustrates a camera-motion system 10 for camera motion estimation according to one embodiment of the invention. The camera-motion system 10 comprises a camera server 100 and a computer system 200 having computer modules for camera motion estimation. The camera server 100 and the computer system 200 are communicatively coupled with each other through a communication line 20.

In one embodiment, the camera server 100 comprises a stereo pair of calibrated cameras 110a-b. The camera server 100 calibrates the stereo pair of the cameras 110a-b and provides visual input data to the computer system 200. The calibrated cameras 110a-b captures the visual input data of a video sequence of synthetic data or real-world data. "Calibrated cameras" from herein means that the internal parameters and external parameters between a stereo pair of cameras are known. The internal parameters of a camera, such as camera focal length, optical center location, skewness of image pixels, and radial distortion of the lens, are often called intrinsic camera parameters. The external parameters of a camera define the location and orientation of a camera with respect to a stereo rig. The external parameters of a camera are often called extrinsic camera parameters. Two calibrated optical systems, such as two calibrated cameras, with respect to a known reference coordinate system are related to each other by a translation matrix and a rotation matrix which map a pixel point in one optical system to a corresponding pixel point in the other optical system. Any applicable camera calibration scheme is readily available within the scope of the invention.

In one embodiment, the computer system 200 includes a processor 250, an input controller 210, an output controller 240 and a memory 220. The memory 220 stores data and/or instructions that may be executed by the processor 250. The instructions may comprise code for performing any and/or all of the techniques described herein. Memory 220 may be a DRAM device, a static random access memory (SRAM), Flash RAM (non-volatile storage), combinations of the above, or some other memory device known in the art. The memory 220 comprises a feature processing module 222, a trifocal motion estimation module 224, an optional adjustment module 226 and a data store 230.

The feature processing module 222 comprises computer executable instructions for carrying out the point and line features detection and tracking process. The trifocal motion estimation module 224 comprises computer executable instructions for estimating camera motion process using the extracted point and line features. The optional adjustment module 226 comprises computer executable instructions for refining camera motion estimated by the trifocal motion estimation module 224. The data store 230 stores the estimated camera motion data of a video scene in one embodiment of the invention.

Figure 2:
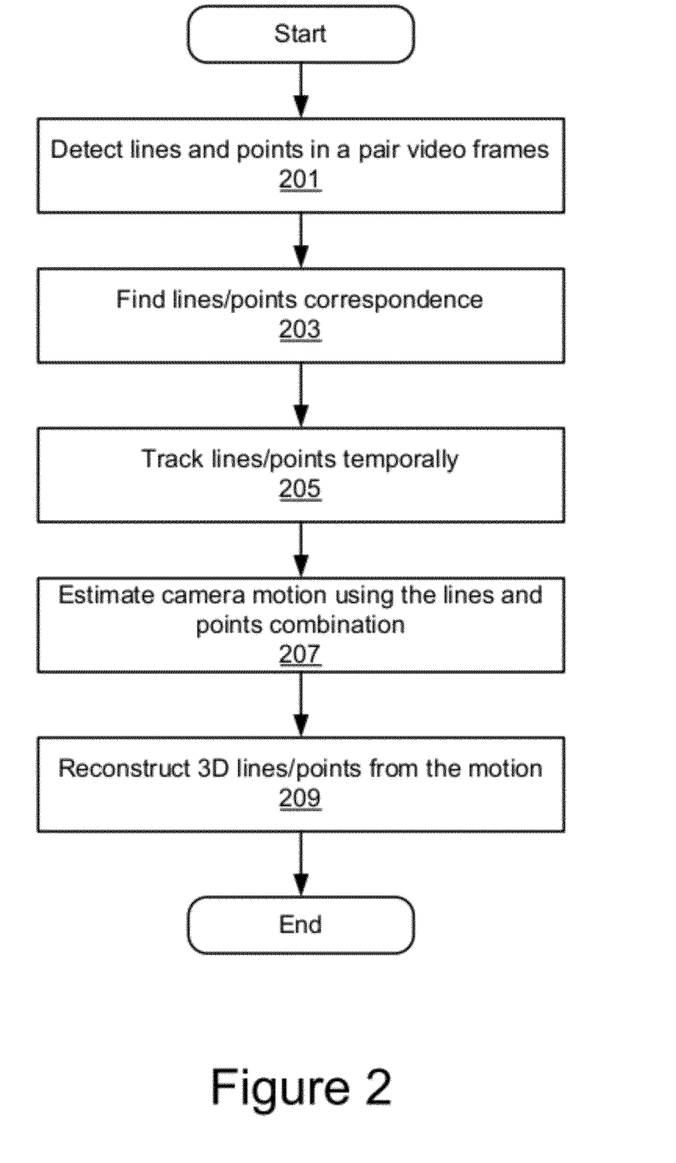
FIG. 2 is a flowchart of a trifocal camera motion estimation method according to one embodiment of the invention.

FIG. 2 is a flowchart of a camera motion estimation method according to one embodiment of the invention. Initially, the camera-motion system 10 detects 201 lines and points by the feature processing module 222 in the video frames captured by the stereo cameras 110a-b. For example, the feature processing module 22 detects points in the video frames using scaled invariant feature transform (SIFT). For line features, the feature processing module 222 detects edges using an edge detection means (e.g., Sobel edge filter) in the visual input data and detects line segments in edge maps formed from the detected edges. The feature processing module 222 uses short edges formed from edge maps after non-maximal suppression of the detected lines. The edges that are close to one another and lie on a same line are linked together to make a longer line.

The feature processing module 222 is further configured to find 203 lines correspondence and points correspondence for each point and line detected in the pair of the simultaneously captured video frames, e.g., a left frame captured by the camera 110a and a right frame by the camera 110b. The feature processing module 222 further tracks 205 points and lines temporally across a plurality of video frames captured at different times. For example, the feature processing module 222 uses dense stereo matching and a sum-of-absolute difference measure to establish the line correspondence. For point correspondence, the feature processing module 222 measures a match between fixed-size feature windows in two consecutive frames as the sum of squared intensity differences over the windows. The displacement is defined as the one that minimizes the sum.

For example, the feature processing module 222 uses KLT feature tracking to track detected points across multiple temporal video frames. Specifically, the feature processing module 222 computes displacement of detected points between two consecutive video frames. The feature processing module 222 tacks a line in a current video frame by tracking individual edges in the line and selects lines for camera estimation from multiple line candidates obtained from the previous video frame. For example, the feature processing module 222 uses a multi-level Lucas-Kanade optical flow with motion fields associated with each detected line.

In step 207, the camera-motion system 10 estimates 207 the motion of the camera 110a-b using points and lines detected by the feature processing module 222. The camera-motion system 10 reconstructs 209 3D points and lines from the estimated motion. The camera motion estimation and point and line reconstruction in steps 207 and 209 are performed by the trifocal motion estimation module 224 to be described in details with reference to FIGS. 3 and 4.

II. Camera Motion Estimation Using Trifocal Tensors

It is desirable to have a visual odometry algorithm that can incorporate any combination of point and line features available in visual input data and generate the best camera motion estimation using the combination set. Using a pair of calibrated trifocal tensors for camera motion estimation, the camera-motion system 10 represents camera rotations by unit quaternions and uses a low-degree polynomial system of equations that enforces the orthonormality constraint.

Trifocal Relations in Camera Motion Estimation

A 3D point in space is represented by a homogeneous 4-vector $X=[X_1\ X_2\ X_3\ X_4]^T \in \mathbb{R}^4$ and its projection on an image plane of camera i by a homogeneous 3-vector $x^i=[x_1^i\ x_2^i\ x_3^i]^T \in \mathbb{R}^3$. Similarly, a line and its projection on the image plane are denoted by the parameters $L=[L_1\ L_2\ L_3\ L_4]^T$ and $l^i=[l_1^i\ l_2^i\ l_3^i]^T$ respectively. A projective camera is given by a 3×4 matrix $K=[\mathcal{R},\ t]$, with K being the 3×3 internal calibration matrix and the 3×3 rotation $\mathcal{R}$ and 3×1 translation vector t representing the exterior camera orientation. Without loss of generality, it is assumed that camera coordinates are normalized and therefore, K is set to be the identity matrix I. A trifocal tensor is represented by $\tau=\{T_i\}_{i=1,2,3}$, with each 3×3 sub-matrix denoted by $T_i$. The $[\ldots]_x$ notation denotes the skew-symmetric matrix for forming a vector cross-product. Colon operator ':' is used to reference rows or columns of matrices. For example, A(:, i) is the $i^{th}$ column, and A(:, [i:j, k]) references columns i to j and column k.

Using a canonical form of camera configuration given by $P_1=[I,\ 0]$, $P_2=[A\ a]$ and $P_3=[B\ b]$ as an example, the trifocal tensor for the three views captured by the cameras, $\tau=\{T_i\}$ is given by the following equation:

$$T_i = A^i b^T - aB^{iT} \quad (1)$$

where $A^i=A(:, i)$, $B^i=B(:, i)$.

Assuming that a line correspondence $l^1 \Leftrightarrow l^2 \Leftrightarrow l^3$ and a point correspondence $x^1 \Leftrightarrow x^2 \Leftrightarrow x^3$ across $P_1, P_2, P_3$, respectively is detected. The relationships between the detected point and line features and the tensor can be expressed by the following equations:

$$l_i^1 = l^{2T} T_i l^3 \quad (2)$$

$$[x^2]_x \left( \sum_i x_i^1 T_i \right) [x^3]_x = 0_{3\times 3} \quad (3)$$

Figure 3:
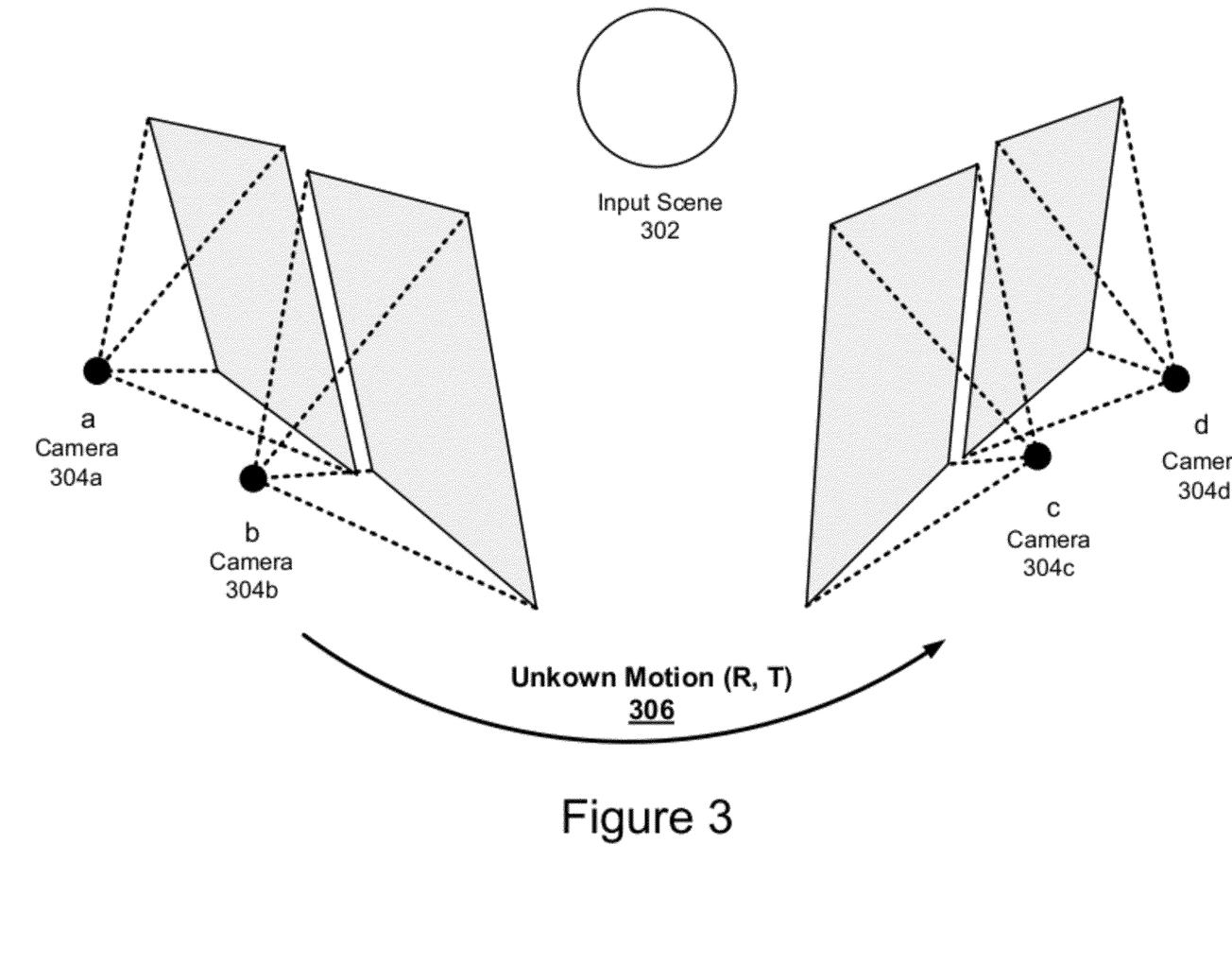
FIG. 3 illustrates an example of trifocal relations between a stereo pair of cameras and configuration for estimating camera motion.
Figure 4:
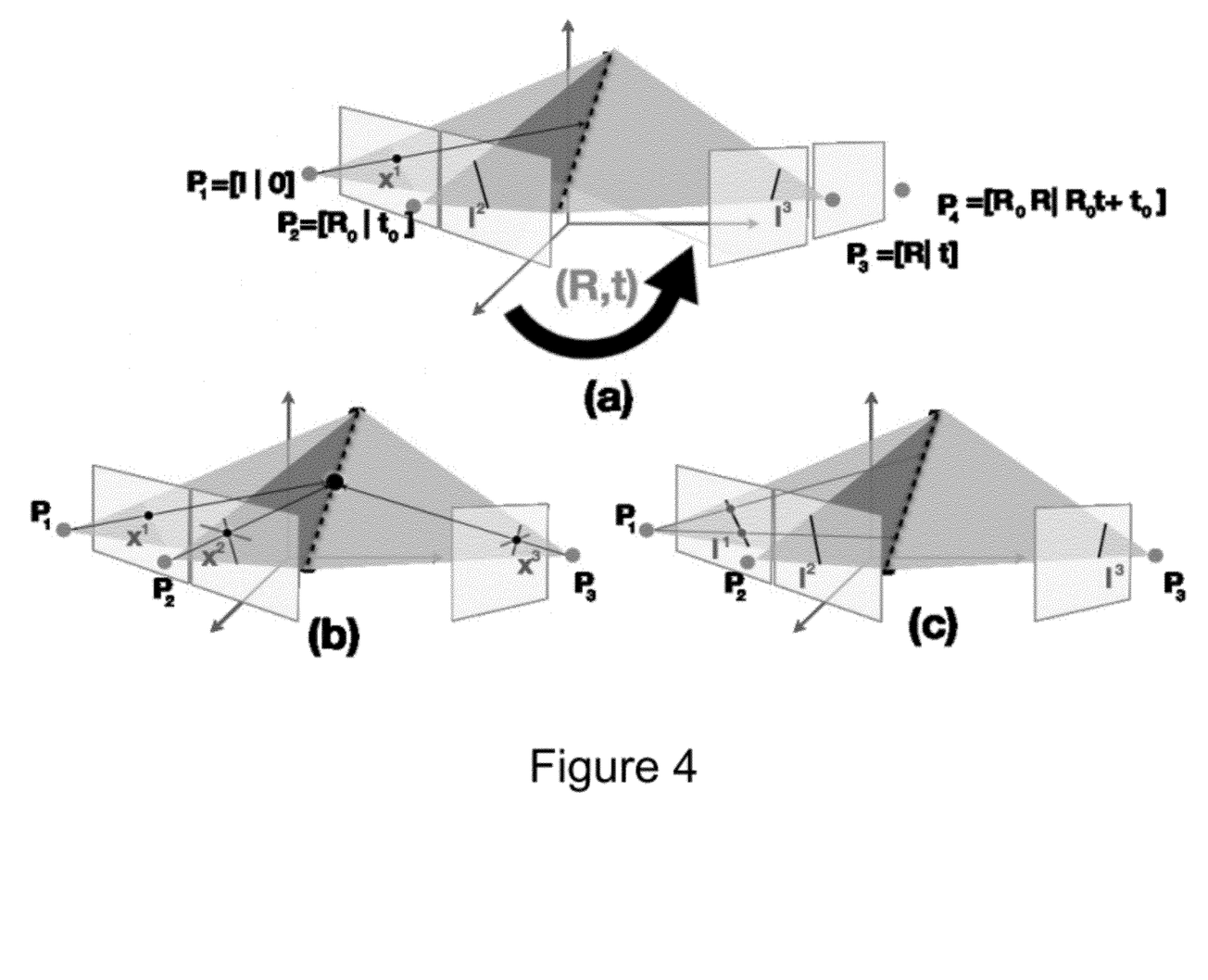
FIG. 4 is illustrates three examples of calibrated tensors and linear solution for camera motion estimation.

FIG. 3 illustrates an example of trifocal relations between a stereo pair of cameras and its configuration for estimating camera motion. In the example illustrated in FIG. 3, two trifocal tensors provide 4 views of an input scene 302. Camera 304a and camera 304b are calibrated. Camera 304c and camera 304d correspond to camera 304a and camera 304b, respectively after camera motion. The camera motion (R, t) is represented by the camera rotation matrix R and translation matrix t. Camera 304a, camera 304b and camera 304c form a first trifocal tensor. Similarly, camera 304a, camera 304b and camera 304cd form a second trifocal tensor. The first and second trifocal tensors provide 4 views of the input scene 302. Each trifocal tensor provides one or more sets of camera motion parameters. From the camera motion estimation parameters, the camera motion (R, t) is estimated. To simplify the description of one embodiment of the invention, the example illustrated in FIG. 3 only shows two trifocal tensors without points or lines correspondence information.

Generally, a single point triplet generates four 3D camera poses and a line-line-line correspondence provides two linearly independent constraints over the tensor parameters. Geometrically, both the point-point-point correspondence and line-line-line correspondence can be best understood in terms of a hypothetical point-line-line correspondence $x^1 \Leftrightarrow l^2 \Leftrightarrow l^3$ (see FIG. 4(a)). The constraint expressed by this arrangement represents the incidence relationship between $x^1$ and the line transferred from $l^3$ via the homography induced by $l^2$.

For a line triplet, each of any two points on a line in a first view establishes a point-line-line configuration giving two equations of camera motion parameters (see FIG. 4(c)). For three matching points $x^1$, $x^2$ and $x^3$, there are four possible permutations obtained by choosing any two linearly independent lines spanned by the points in the $P_2$ and $P_3$ (see FIG. 4(b)).

Calibrated Trifocal Tensors and Linear Solution

To further illustrate the calibrated trifocal tensors described above, FIG. 4(a) represents a stereo geometry for two views and a point-line-line configuration. The binocular stereo rig in FIG. 4(a) is represented in its canonical form, with the left and right camera matrices $P_1=[I, 0]$, $P_2=[R_0\ t_0]$ respectively. $(R_0, t_0)$ encodes the rigid geometry of the stereo rig, and is fixed and known a-priori. After undergoing arbitrary rotation R and translation t, the corresponding cameras in the same coordinate system can be written as:

$$P_3 = [R\ t] \quad (4)$$

$$P_4 = [R_0 R\ R_0 t + t_0] \quad (5)$$

The canonical forms of the cameras can be recursively applied to every pair of stereo views before and after motion, and the goal of the trifocal tensors used by the trifocal motion estimation module 224 is to estimate the camera motion (R, t). The camera matrices described above can be simplified further by taking into consideration that for a rectified stereo pair, $R_0 = I$ and $t_0 = [t_x\ 0\ 0]^T$, where $t_x$ is given by the baseline of a pair of calibrated cameras. Rectification is a process often used in computer stereo vision to simplify the problem of finding matching points between a pair of images captured by a pair of calibrated cameras. Rectification transforms the images to make the epipolar lines align horizontally, resulting in simplified correspondence search.

The geometric framework of trifocal camera motion estimation is composed of two trifocal tensors; $\tau^L = \{T_i^L\}$ arising out of image correspondences between cameras $P_1$, $P_2$, $P_3$ and $\tau^R = \{T_i^R\}$ from correspondences between $P_1$, $P_2$, $P_4$. The two trifocal tensors, using equations (1) to (5), are given as $$T_i^L = R_0^i t^T - t_0 R^{iT} \quad (6)$$

$$T_i^R = R_0^i (R_0 t + t_0)^T - t_0 (R_0 R)^{iT} \quad (7)$$

Since the stereo configuration is fixed and known, the trifocal motion estimation module 224 is configured to estimate the twelve parameters of the underlying motion to fix $\tau^L$ and $\tau^R$. From correspondence sets of the form $\{l^1 \Leftrightarrow l^2 \Leftrightarrow l^3; l^1 \Leftrightarrow l^2 \Leftrightarrow l^4\}$ or $\{x^1 \Leftrightarrow x^2 \Leftrightarrow x^3; x^1 \Leftrightarrow x^2 \Leftrightarrow x^4\}$ in equations (2) and (3), the trifocal motion estimation module 224 can use a concatenated linear system in terms of the twelve unknown parameters of the camera motion. Furthermore, an image line can be parameterized by taking any two arbitrary points lying on it. The elements of the rotation matrix R and translation matrix t can be written as the following:

$$Ay = 0 \quad (8)$$

$$y = [r_{11}\ r_{21}\ r_{31}\ r_{12}\ r_{22}\ r_{32}\ r_{13}\ r_{23}\ r_{33}\ t_1\ t_2\ t_{31} 1]^T \quad (9)$$

where $r_{ij}$ is the $(i, j)^{th}$ element of the rotation matrix R and translation matrix $t = [t_1\ t_2\ t_3]^T$. Due to the form of equation (7), the linear system represented by equations (8) and (9) are not homogeneous.

The trifocal motion estimation module 224 is further configured to geometrically derive the minimum number of feature correspondences (over the four views) to solve equation (8). Taking $x^1 \Leftrightarrow x^2 \Leftrightarrow x^3$ as an example, with $P_1$ and $P_2$ fixed, a corresponding 3D point X is defined from the first two views. Thus, $x^3 = P_3 X$ provides only two linearly independent equations for the unknown camera motion (R, t). Theoretically, therefore, $\{x^1 \Leftrightarrow x^2 \Leftrightarrow x^3; x^1 \Leftrightarrow x^2 \Leftrightarrow x^4\}$ must generate 4 linearly independent equations. However, $P_3$ and $P_4$ form a stereo pair and the following relationship holds for any rectified stereo pair i and j:

$$x_3^i x_2^j - x_2^i x_3^j = 0 \quad (10)$$

Thus, on concatenating point correspondence constraints from $\tau^L$ and $\tau^R$, only 3 linearly independent equations are needed.

Given that equation (10) is not invoked for general points on matching lines, it can be shown that a line quartet provides 4 linearly independent equations. The dependencies can also be seen by performing row operations on A matrix of equation (8). Hence, given n point and m line correspondence sets, matrix A has 3n+4m independent rows. A linear solution, therefore, can be obtained for {4 points} or {3 lines} or {3 points+1 line} or {2 points+2 lines}. The linear solution using {3 points+1 line} or {2 points+2 lines} are over constrained in terms of system performance. An over constrained camera motion system has more constraints than camera motion variables and there may not be a solution to the system. In one embodiment, the trifocal motion estimation module 224 computes the best approximate solution to the camera motion system, which minimizes the least-square error of the estimation. In the presence of noise, the trifocal motion estimation module 224 can use more than the minimum number of equations per correspondence. The trifocal motion estimation module 224 can refine the solution to equation (8) by minimizing Frobenius norm with respect to an orthonormal matrix.

Subspace Solution for Trifocal Camera Motion Estimation

Using nonlinear techniques, the trifocal motion estimation module 224 can solve for y in equation (8) from a combination of only {3 points} or {2 points+1 line} or {2 lines+1 point}, each of which provides 9, 10 or 11 linearly independent equations. For example, a {2 line} solution can also be obtained (with 8 equations), but is unstable in the presence of noise.

To solve equation (8) nonlinearly given at least 3 correspondences, the least number of constraints is 9 equations from {3 points}(for 12 unknown parameters), and the solution can be given by a 3 (i.e., 12−9) dimensional subspace. However, as the system of equations is non-homogeneous, equation (9) can be written as the following:

$$y = y_p + \alpha y_1 + \beta y_2 + \gamma y_3 \quad (11)$$

where $y_p$ is a "particular solution" of a non-homogeneous linear system that can be computed from the psuedo-inverse of matrix A and $y_1$, $y_2$ and $y_3$ are the eigenvectors corresponding to the smallest eigenvalues from a singular value decomposition on matrix A.

To solve for $\alpha$, $\beta$, and $\gamma$ and simultaneously ensure orthonormality for the rotation part, the six polynomial constraints expressing unit norm for each row of rotation matrix R and orthogonality between any two rows can be applied. The resulting polynomial system of equations may then be solved by a variety of techniques such as Groebner basis or polynomial eigenvalue problem (PEP).

While better than the linear approach, the subspace of A can still be unstable in the presence of noise. This instability can be traced back to the underlying noisy tensor constraints that do not faithfully encode a camera representing rigid motion. Conventional solutions require estimating epipoles and applying additional constraints on the camera matrices. The camera-motion system 10 using trifocal camera motion estimation provides a much more robust solution without requiring any additional information or imposing further constraints.

Quaternion-based Direct Solution for Trifocal Camera Motion Estimation

A rotation matrix R can be parameterized in terms of the unit quaternion $q=a+bi+cj+dk$:

$$R = \begin{bmatrix} a^2+b^2-c^2-d^2 & 2(bc-ad) & 2(ac+bd) \\ 2(ad+bc) & a^2-b^2+c^2-d^2 & 2(cd+ab) \\ 2(bd-ac) & 2(ab+cd) & a^2-b^2-c^2+d^2 \end{bmatrix}$$

Rewriting equation (8) using this parameterization, the trifocal motion estimation module 224 obtains the following system of equations:

$$A'y'=0$$

$$y'=[a^2\ b^2\ c^2\ ab\ ac\ ad\ bc\ bc\ cd\ t_1\ t_2\ t_3 1]^T \quad (12)$$

The trifocal motion estimation module 224 is configured to first solve for the quaternion parameters. $(t_1\ t_2\ t_3)$ in equation (12) are expressed in terms of the other parameters by performing the following steps:

$$A'(:,[11:13])C_t = A'(:,[1:10,14]) \quad (13)$$

$$A_t = A'(:,[1:10.14]) - A'(:,[11:13])C_t \quad (14)$$

$$A_t y_t = 0 \quad (15)$$

$$y_t = [a^2\ b^2\ c^2\ d^2\ ab\ ac\ ad\ bc\ bd\ cd 1]^T$$

The translation part is given by $[t_1\ t_2\ t_3]^T = -C_t y_t$ and trifocal motion estimation module 224 has to only solve the polynomial system represented in equation (15).

To ensure that in the presence of noise, a consistent rotation is obtained, the trifocal motion estimation module 224 include the quaternion constraint $a^2+b^2+c^2+d^2=1$. To solve for $y_t$, the trifocal motion estimation module 224 uses a method of elimination by writing the monomials ($b^2$, $c^2$, $d^2$, bc, bd, cd) in terms of ($a^2$, ab, ac, ad, 1) as the following:

$$\begin{bmatrix} b^2 \\ c^2 \\ d^2 \\ bc \\ bd \\ cd \end{bmatrix} = C_q \begin{bmatrix} a^2 \\ ab \\ ac \\ ad \\ 1 \end{bmatrix} \quad (16)$$

where, $$A_t(:,[2:4,8:10])C_q = A_t(:,[1,5:7,11]) \quad (17)$$

There should be sufficient correspondences so that equation (17) is not underconstrained. $A_t(:,[2:4,8:10])$ submatrix should have at least rank 6, implying at least 6 linearly independent rows. Since one independent constraint is already provided by quaternion unit norm condition, 5 or more independent rows should come from the point or line correspondences in matrix $A'_t$. Given that the manipulation in equation (14) introduces dependencies in $A_t$, the minimal configuration sets are {3 points} or {2 lines} or {2 points+1 line}. The {2 lines} configuration tends to be less stable in the presence of noise. The trifocal motion estimation module 224 employs {3 lines} and includes {2 lines+1 point} sets. From a systems point of view, this allows the trifocal motion estimation module 224 to use a uniform set size of 3 features for any combination in a RANSAC setting. The minimal 3 feature criterion ensures that the trifocal motion estimation module 224 is able to solve equations (13) and (17). In the presence of noise, the trifocal motion estimation module 224 can use more than just the linearly independent rows provided by each correspondence.

Now, the left hand side terms in equation (16) can be rewritten as $$\begin{bmatrix} b^2 \\ c^2 \\ d^2 \\ bc \\ bd \\ cd \end{bmatrix} = \begin{bmatrix} [1] & [1] & [1] & [2] \\ [1] & [1] & [1] & [2] \\ [1] & [1] & [1] & [2] \\ [1] & [1] & [1] & [2] \\ [1] & [1] & [1] & [2] \\ [1] & [1] & [1] & [2] \end{bmatrix} \begin{bmatrix} b \\ c \\ d \\ 1 \end{bmatrix} \quad (18)$$

where [i] represents an $i^{th}$ degree polynomial in a. It is noted that not all terms in the left hand side of equation (18) are independent and they should satisfy the following conditions:

$$(bc)^2=(b^2)(c^2)\ (bc)(bd)=(b^2)(cd)$$

$$(bd)^2=(b^2)(d^2)\ (bc)(cd)=(c^2)(bd)$$

$$(cd)^2=(c^2)(d^2)\ (bd)(cd)=(d^2)(bc)$$

Applying the above conditions to the terms in the right hand side of equation (18), the trifocal motion estimation module 224 obtains the following final system of constraints:

$$\begin{bmatrix} [3] & [3] & [3] & [4] \\ [3] & [3] & [3] & [4] \\ [3] & [3] & [3] & [4] \\ [3] & [3] & [3] & [4] \\ [3] & [3] & [3] & [4] \\ [3] & [3] & [3] & [4] \end{bmatrix} \begin{bmatrix} b \\ c \\ d \\ 1 \end{bmatrix} = 0 \quad (19)$$

By hypothesis, there exists a solution to $[b\ c\ d\ 1]^T$, thus, any 4×4 submatrix in equation (19) has a determinant equal to 0. This gives a 13-degree polynomial in a.

$$(k_1 a^{10}+k_1 a^8+k_3 a^6+k_4 a^4+k_5 a^2+k_6)a^3=0 \quad (20)$$

Let $\alpha=a^2$, equation (20) becomes:

$$k_1\alpha^5+k_2\alpha^4+k_3\alpha^3+k_4\alpha^2+k_5\alpha+k_6=0 \quad (21)$$

The 5-degree polynomial represented in equation (21) can be easily solved and the real-values a's are retained. The trifocal motion estimation module 224 obtains the rotation matrix R composed after (b, c, d) are obtained from the null-vector of the 4×4 sub-matrix and translation matrix $[t_1\ t_2\ t_3]^T=-C_t y_t$.

Compared with conventional 3-point camera motion estimation algorithms, the embodiments of the trifocal camera motions estimation obtain better motion hypotheses in the presence of noise. In case there are multiple solutions in a RANSAC setting, the trifocal motion estimation module 224 selects the motion parameters with the largest support. Furthermore, once the best solution of camera motion and corresponding inliers (e.g., reconstructed 3D points and lines) have been found, the trifocal motion estimation module 224 can refine the camera estimation using equation (12) for consistency.

The camera motion estimated by the trifocal motion estimation module 224 can be further optimized by the adjustment module 226. Any existing camera motion parameters refinement algorithms can be used by the adjustment module 226. In one embodiment, the adjustment module 224 uses bundle adjustment algorithm to produce jointly optimal 3D structure of the image scene and camera motion parameters.

III. Application of Trifocal Camera Motion Estimation

Figure 1B:
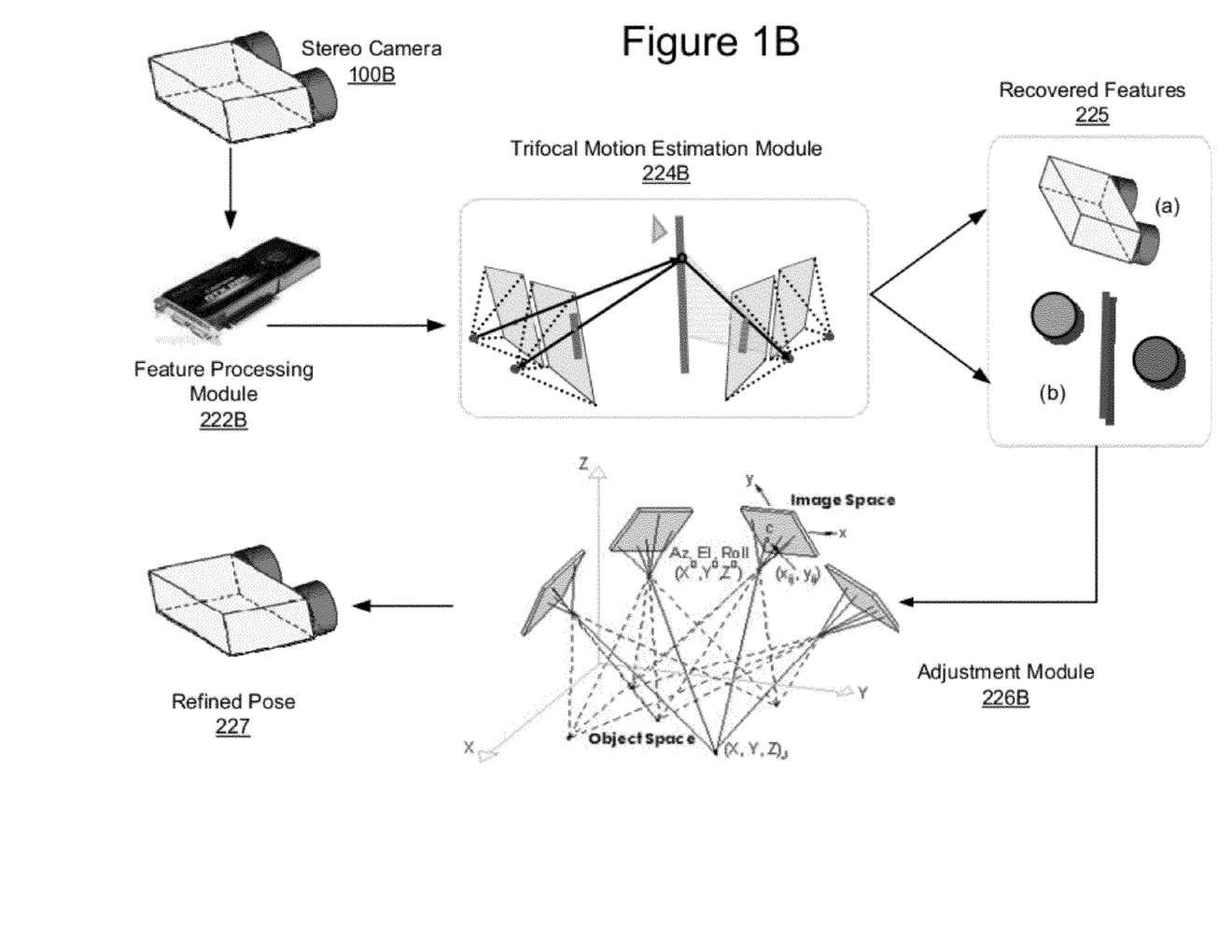
FIG. 1B illustrates a flow diagram of the camera-motion system for camera motion estimation illustrated in FIG. 1A.

To further illustrate the trifocal camera motion estimation described above, FIG. 1B illustrates a flow diagram of a camera-motion system using trifocal camera motion estimation. A pair of calibrated cameras 110B is configured to provide visual input data (e.g., video frames) to the feature processing module 222B. The calibrated cameras 110a-b captures the visual input data of a video sequence of synthetic data or real-world data. The feature processing module 222B detects points and lines in the visual input data, tracks the detected points and lines across multiple video frames and generates points correspondence and line correspondence among the camera views of the video frames of the visual input data. From the detected points and lines, the trifocal motion estimation module 224B estimates the camera motion using one or more of the various solutions described above. From the estimated camera motion, the camera-motion system reconstructs the camera pose 225(a) after camera motion and 3D structures 225(b) (e.g., 3D points and lines). To refine the camera motion and 3D structures, an optional adjustment module 226B can be applied to the estimated camera motion and 3D structures to generate a refined pose 227 of the cameras.

To quantify the performance of the various solutions to the camera motion problem, such as the linear solution, the subspace solution and the quaternion-based direct solution described above, the various solutions are applied to both synthetic data and real-world data with various noise levels and camera motions. In one embodiment, the first stereo pair of cameras is randomly generated with known random camera configurations and the second stereo pair (i.e., the first pair stereo pair with random rotation and translation) is displaced with a random motion to be estimated. 3D scene geometry and image correspondences are also created by randomly generating 3D points and lines in space, and projecting them onto the four cameras. To observe the simulation performance of various camera motion estimation solutions with synthetic data, noise of varying standard deviations is added to the points and lines in each view. In one embodiment, zero mean Gaussian noise with varying standard deviations is added to the coordinates of image lines and points in each view.

Figure 5:
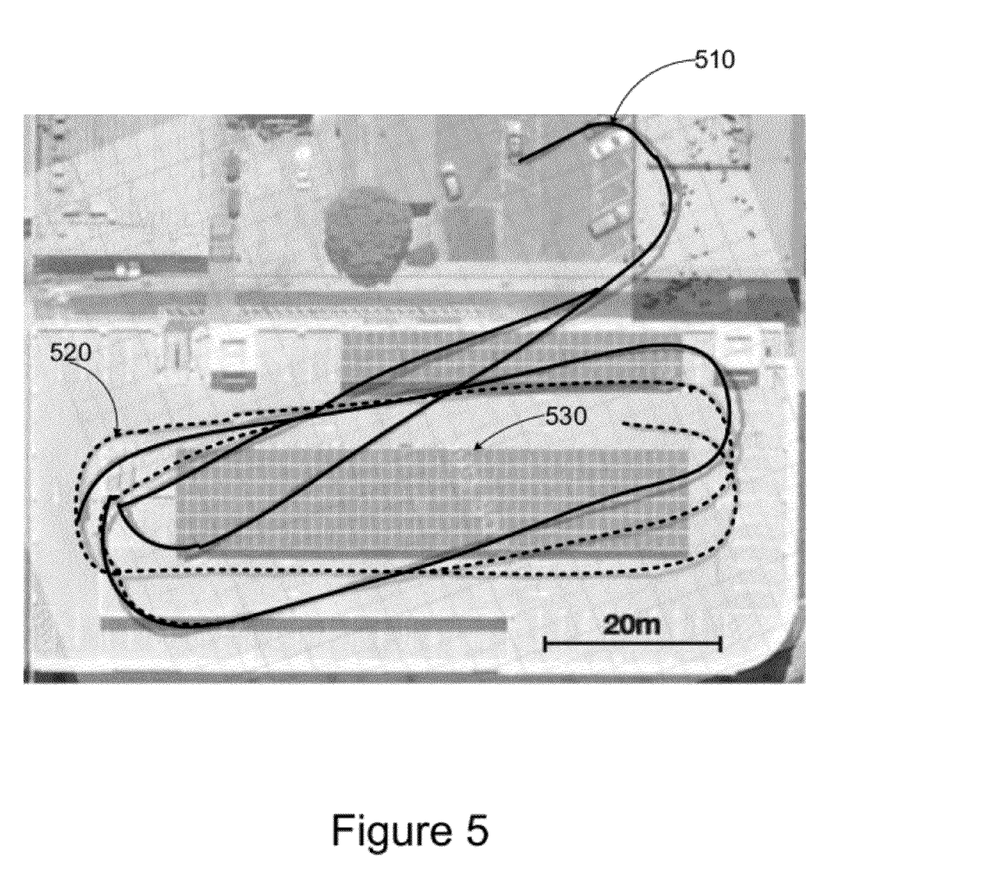
FIG. 5 illustrates a comparison of estimating camera motion using a 3-point algorithm and the trifocal camera motion estimation illustrated in FIG. 2 of a video sequence.

Real-world data are more challenging than synthetic data for camera motion estimation in that the line and point features extracted from the real-world data have different error statistics with significant impact on camera motion estimation performance. FIG. 5 shows a comparison of applying one embodiment of the trifocal camera motion estimation and a conventional 3-point camera motion estimation algorithm. The visual input data is a video sequence of a parking structure in a large and open space. The video sequence has about 2036 video frames captured by a pair of calibrated camera moving around the larger part (i.e., 530) of the parking structure. Some of the video frames have very little texture or clustered point features on one side of the parking structure, which is very challenging for accurate camera motion estimation.

FIG. 5 shows one video frame of the video sequence. The camera motion estimated by the conventional 3-point camera motion estimation is represented by the solid line 510. The camera motion estimated by the trifocal camera motion estimation is represented by the dotted line 520. The 3-point algorithm (e.g., 510 line) performs noticeably worse, exhibiting a severe break (e.g., near top of the parking structure) and veering off from the loop of the camera movement.

Embodiments of the trifocal camera motion estimation provide a robust solution for estimating camera motion with a stereo pair of cameras and combinations of point and line features of visual input data. As shown by the experiments, using assorted feature sets of points and lines leads to better motion estimate than the conventional visual odometry algorithms in real world scenarios. For example, the quaternion based solution yields significantly better motion estimate than the conventional linear/subspace methods in the presence of noise and provides a robust mechanism for extracting camera matrices from noisy trifocal tensors. Furthermore, the embodiments of the trifocal camera motion estimation allow more than the minimal set of point and line features to be used in a RANSAC setting, leading to significantly better results with no severe penalties on real-time performance.

What is claimed is:

1. A computer implemented method for estimating camera motion of a visual input scene, the method comprising:
  receiving visual input data captured by a stereo pair of cameras, the stereo pair of cameras being calibrated and the visual input data comprising a plurality of image frames;
  detecting points and lines in the received visual input data;
  finding point correspondences between the detected points and line correspondences between the detected lines in the visual input data;
  tracking the detected points and lines temporally across the plurality of the image frames; and
  estimating the camera motion using the detected points and lines in the visual input data, wherein estimating the camera motion comprises:
    forming a first trifocal tensor and a second trifocal tensor, the first trifocal tensor comprising the calibrated stereo pair of the cameras and a first camera of a corresponding stereo pair of cameras and the second trifocal tensor comprising the calibrated stereo pair of the cameras and a second camera of the corresponding stereo pair of cameras;
    selecting a three-feature combination of detected points and lines, the three-feature combination being at least one of: a combination of two detected points and one detected line or a combination of one detected point and two detected lines; and
    estimating a plurality of camera motion parameters associated with the first trifocal tensor and the second trifocal tensor from the selected combination of detected points and lines.

2. The method of claim 1, wherein detecting lines in the received input data comprises:
  detecting edges in the received input data using an edge detection means and generating corresponding edge images of the input data; and
  building an edge map based on the edge images of the received input data.

3. The method of claim 1, wherein detecting points in the received input data comprises applying scaled invariant feature transform to the input data.

4. The method of claim 1, wherein finding point correspondences between the detected points in the received input data comprises measuring a match between two feature windows in two temporally consecutive image frames of the input data.

5. The method of claim 1, wherein estimating the camera motion using the detected points and lines in the visual input data comprises:
   parameterizing the stereo pair of cameras and a corresponding stereo pair of cameras, the corresponding stereo pair of camera being related by camera motion and the camera motion being defined by a rotation matrix and a translation matrix;
   presenting camera motion to be estimated in terms of the rotation matrix and the translation matrix and the plurality of camera motion parameters associated with the first trifocal tensor and the second trifocal tensor; and
   determining the rotation matrix and the translation matrix based on the estimated camera motion parameters associated with the first trifocal tensor and the second trifocal tensor.

6. The method of claim 1, wherein the first trifocal tensor provides a first set of three views of the visual input scene captured by the three cameras associated with the first trifocal tensor.

7. The method of claim 1, wherein the second trifocal tensor provides a second set of three views of the visual input scene captured by the three cameras associated with the second trifocal tensor.

8. The method of claim 1, wherein estimating a plurality of camera motion parameters associated with the first trifocal tensor and the second trifocal tensor comprises deriving the plurality of camera motion parameters using a concatenated linear system of the plurality of camera motion parameters.

9. The method of claim 1, wherein estimating a plurality of camera motion parameters associated with the first trifocal tensor and the second trifocal tensor comprises deriving the plurality of camera motion parameters using a sub-space non-linear system of the plurality of camera motion parameters.

10. The method of claim 9, wherein the sub-space non-linear system of the plurality of camera motion parameters comprises a combination of detected lines and points including at least one of:
    three detected points;
    two detected points and one detected line; and
    two detected lines and one detected point.

11. The method of claim 1, wherein estimating a plurality of camera motion parameters associated with the first trifocal tensor and the second trifocal tensor comprises deriving the plurality of camera motion parameters using a quaternion-based system of the plurality of camera motion parameters.

12. The method of claim 11, wherein the rotation matrix of the quaternion-based system of the plurality of camera motion parameters is represented by a unit quaternion.

13. The method of claim 1, wherein estimating the camera motion further comprises:
    responsive to detection of presence of noise in the visual input data, selecting additional detected lines and points; and
    estimating a plurality of camera motion parameters associated with the first trifocal tensor and the second trifocal tensor from the selected combination of detected points and lines.

14. A computer system for estimating camera motion of a visual input scene, the system comprising:
    an input receiving module configured to receive visual input data captured by a stereo pair of cameras, the stereo pair of cameras being calibrated and the visual input data comprising a plurality of image frames;
    a feature processing module configured to:
       detect points and lines in the received visual input data;
       find point correspondences between the detected points and line correspondences between the detected lines in the visual input data;
       track the detected points and lines temporally across the plurality of the image frames; and
    a trifocal motion estimation module configured to estimate the camera motion using the detected points and lines in the visual input data, wherein estimating the camera motion comprises:
       forming a first trifocal tensor and a second trifocal tensor, the first trifocal tensor comprising the calibrated stereo pair of the cameras and a first camera of a corresponding stereo pair of cameras and the second trifocal tensor comprising the calibrated stereo pair of the cameras and a second camera of the corresponding stereo pair of cameras;
       selecting a three-feature combination of detected points and lines, the three-feature combination being at least one of including at least one of: a combination of two detected points and one detected line or a combination of one detected point and two detected lines; and
       estimating a plurality of camera motion parameters associated with the first trifocal tensor and the second trifocal tensor from the selected combination of detected points and lines.

15. The system of claim 14, wherein the feature processing module is further configured to:
    detect edges in the received input data using an edge detection means and generate corresponding edge images of the input data; and
    build an edge map based on the edge images of the received input data.

16. The system of claim 14, wherein the feature processing module is further configured to apply scaled invariant feature transform to the input data.

17. The system of claim 14, wherein the feature processing module is further configured to measure a match between two feature windows in two temporally consecutive image frames of the input data.

18. The system of claim 14, wherein the trifocal motion estimation module is further configured to:
    parameterize the stereo pair of cameras and a corresponding stereo pair of cameras, the corresponding stereo pair of camera being related by camera motion and the camera motion being defined by a rotation matrix and a translation matrix;
    present camera motion to be estimated in terms of the rotation matrix and the translation matrix and the plurality of camera motion parameters associated with the first trifocal tensor and the second trifocal tensor; and
    determine the rotation matrix and the translation matrix based on the estimated camera motion parameters associated with the first trifocal tensor and the second trifocal tensor.

19. The system of claim 14, wherein the first trifocal tensor provides a first set of three views of the visual input scene captured by the three cameras associated with the first trifocal tensor.

20. The system of claim 14, wherein the second trifocal tensor provides a second set of three views of the visual input scene captured by the three cameras associated with the second trifocal tensor.

21. The system of claim 14, wherein the trifocal motion estimation module is further configured to derive the plurality of camera motion parameters using a concatenated linear system of the plurality of camera motion parameters.

22. The system of claim 14, wherein the trifocal motion estimation module is further configured to derive the plurality of camera motion parameters using a sub-space non-linear system of the plurality of camera motion parameters.

23. The system of claim 22, wherein the sub-space non-linear system of the plurality of camera motion parameters comprises a combination of detected lines and points including at least one of:
   three detected points;
   two detected points and one detected line; and
   two detected lines and one detected point.

24. The system of claim 14, wherein the trifocal motion estimation module is further configured to derive the plurality of camera motion parameters using a quaternion-based system of the plurality of camera motion parameters.

25. A non-transitory computer-readable storage medium storing executable computer program instructions for estimating camera motion of a visual input scene, the computer program instructions comprising instructions for:
   receiving visual input data captured by a stereo pair of cameras, the stereo pair of cameras being calibrated and the visual input data comprising a plurality of image frames;
   detecting points and lines in the received visual input data;
   finding point correspondences between the detected points and line correspondences between the detected lines in the visual input data;
   tracking the detected points and lines temporally across the plurality of the image frames; and
   estimating the camera motion using the detected points and lines in the visual input data, wherein estimating the camera motion comprises:
      forming a first trifocal tensor and a second trifocal tensor, the first trifocal tensor comprising the calibrated stereo pair of the cameras and a first camera of a corresponding stereo pair of cameras and the second trifocal tensor comprising the calibrated stereo pair of the cameras and a second camera of the corresponding stereo pair of cameras;
      selecting a three-feature combination of detected points and lines, the three-feature combination being at least one of including at least one of: a combination of two detected points and one detected line or a combination of one detected point and two detected lines; and
      estimating a plurality of camera motion parameters associated with the first trifocal tensor and the second trifocal tensor from the selected combination of detected points and lines.

26. The computer-readable storage medium of claim 25, wherein the computer program instructions for estimating the camera motion using the detected points and lines in the visual input data comprise instructions for:
   parameterizing the stereo pair of cameras and a corresponding stereo pair of cameras, the corresponding stereo pair of camera being related by camera motion and the camera motion being defined by a rotation matrix and a translation matrix;
   presenting camera motion to be estimated in terms of the rotation matrix and the translation matrix and the plurality of camera motion parameters associated with the first trifocal tensor and the second trifocal tensor; and
   determining the rotation matrix and the translation matrix based on the estimated camera motion parameters associated with the first trifocal tensor and the second trifocal tensor.

27. The computer-readable storage medium of claim 25, wherein the first trifocal tensor provides a first set of three views of the visual input scene captured by the three cameras associated with the first trifocal tensor.

28. The computer-readable storage medium of claim 25, wherein the second trifocal tensor provides a second set of three views of the visual input scene captured by the three cameras associated with the second trifocal tensor.

29. The computer-readable storage medium of claim 25, wherein the computer program instructions for estimating a plurality of camera motion parameters associated with the first trifocal tensor and the second trifocal tensor comprise instructions for deriving the plurality of camera motion parameters using a concatenated linear system of the plurality of camera motion parameters.

30. The computer-readable storage medium of claim 25, wherein the computer program instructions for estimating a plurality of camera motion parameters associated with the first trifocal tensor and the second trifocal tensor comprise instructions deriving the plurality of camera motion parameters using a sub-space non-linear system of the plurality of camera motion parameters.

31. The computer-readable storage medium of claim 25, wherein the computer program instructions for estimating a plurality of camera motion parameters associated with the first trifocal tensor and the second trifocal tensor comprise deriving the plurality of camera motion parameters using a quaternion-based system of the plurality of camera motion parameters.

* * * * *